H. A. PEDRICK.
TOOL FEEDING MECHANISM.
APPLICATION FILED DEC. 21, 1917.

1,307,266.

Patented June 17, 1919.
2 SHEETS—SHEET 1.

Inventor.
Howard A. Pedrick.
by his Attorneys.
Howson & Howson

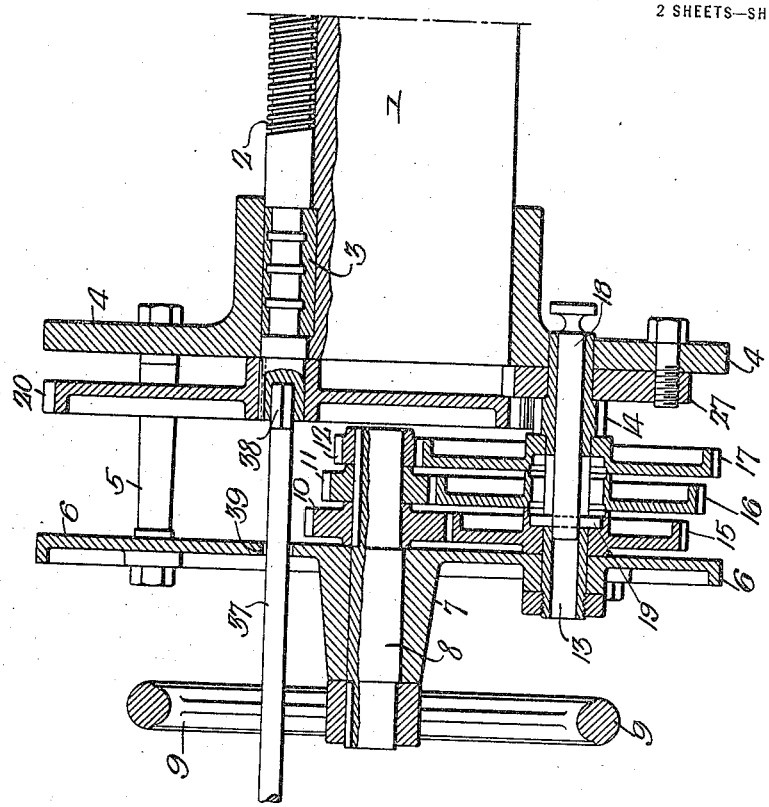

UNITED STATES PATENT OFFICE.

HOWARD A. PEDRICK, OF BALA, PENNSYLVANIA, ASSIGNOR TO PEDRICK TOOL AND MACHINE COMPANY, OF PHILADELPHIA, PENNSYLVANIA, A FIRM CONSISTING OF ALBERT D. PEDRICK AND HOWARD A PEDRICK.

TOOL-FEEDING MECHANISM.

1,307,266.      Specification of Letters Patent.      Patented June 17, 1919.

Application filed December 21, 1917. Serial No. 208,300.

*To all whom it may concern:*

Be it known that I, HOWARD A. PEDRICK, a citizen of the United States, and a resident of Bala, Montgomery county, Pennsylvania, have invented Tool-Feeding Mechanism, of which the following is a specification.

One object of this invention is to provide a relatively simple, compact and conveniently operated combination of parts for moving the tool carried by a boring bar at a relatively high speed when its cutter is not in operation;—the invention contemplating mechanism particularly adapted for use in connection with the apparatus described and claimed in my Patent #1,230,020, dated June 12, 1917, whereby the feed screw, and therefore the tool actuated thereby, may be rapidly moved longitudinally of the apparatus, either by hand or power, independently of the train of mechanism ordinarily employed for feeding said tool when it is cutting.

These objects and other advantageous ends I secure as hereinafter set forth, reference being had to the accompanying drawings, in which, Figure 1 is a longitudinal vertical section, showing sufficient of a boring bar and the tool-feeding mechanism used in connection therewith to illustrate my invention;

Fig. 3 is a longitudinal vertical section, similar to Fig. 1, illustrating a modification of the invention; and Fig. 4 is a fragmentary vertical section illustrating a device for actuating the feed screw by power.

Figure 1:
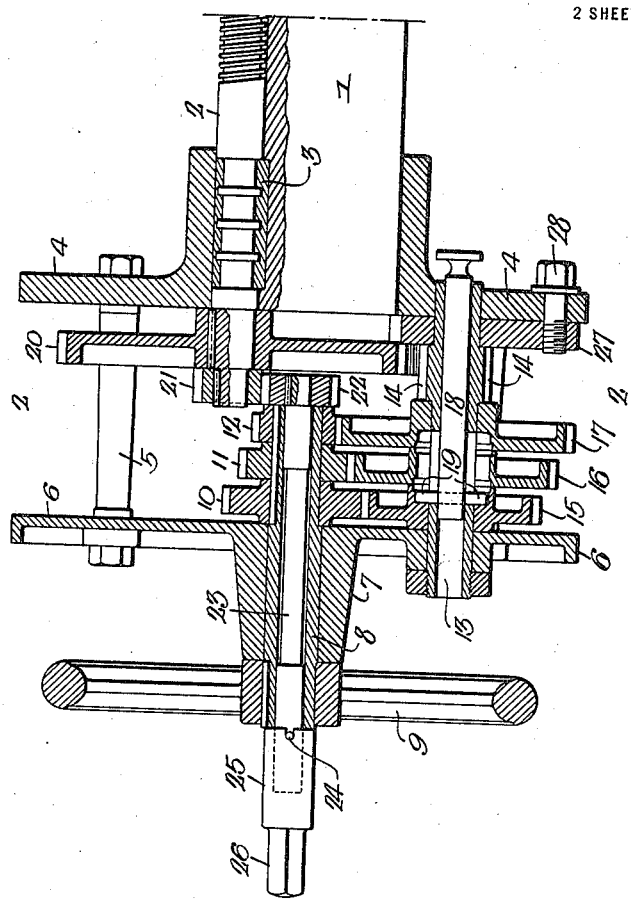
Figure 2:
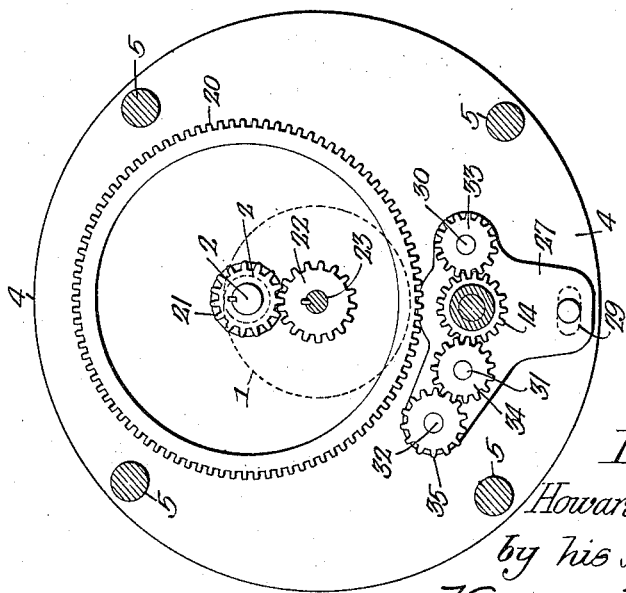
Fig. 2 is a transverse vertical section on the line 2—2, Fig. 1.

In the above drawings, 1 represents a relatively heavy shaft constituting a boring bar which may be mounted and equipped with one or more cutting tools in any of the ways well known to those skilled in the machine tool art. For moving the tool or tools longitudinally of this bar, or for moving said bar longitudinally, the latter is longitudinally slotted or recessed for the reception of a feed screw 2, journaled in suitable bearings of which one is illustrated at 3 as set in said bar.

Fixed to one end of the bar so as to turn therewith, is a circular plate 4, which through a series of laterally projecting bolts 5, is rigidly connected to and supports a second plate 6. This latter is centrally flanged or formed to provide an elongated hub 7 in which is rotatably mounted a sleeve 8 keyed or otherwise fixed at its outer end to a hand wheel 9 and at its inner end having keyed to it three gears, 10, 11 and 12, of progressively decreasing diameters and numbers of teeth.

Extending between the two plates 6 and 4, is a hollow sleeve 13, having rigidly fixed to it, in the present instance integrally, a gear or pinion 14 and carrying loosely a series of gears 15, 16 and 17 of progressively increasing diameters, which respectively mesh with the gears 10, 11 and 12. Slidably mounted within the sleeve 13 is a headed rod 18 having a transversely extending key 19 and adjustable at will to cause said key to operatively connect any one of the gears 15, 16 or 17 to said sleeve or hollow shaft 13.

The feed screw 2 projects beyond the outer face of the plate 4 and has fixed to it a relatively large gear 20 and a pinion 21 of which the latter is at all times in mesh with a small gear or pinion 22 fixed to the inner end of a shaft 23 rotatably mounted within the hollow shaft 8. Said shaft 23 projects beyond the outer end of the sleeve and has mounted in it a transverse pin or key 24, designed to enter a pair of end recesses in a socket 25 whose outer end 26 has a square or other non-circular section for the reception of an operating wrench or handle.

For connecting the gears 20 and 14, I provide a carrier plate 27 mounted to oscillate on the hollow shaft 13 and capable of being clamped in any adjusted position by a stud bolt 28 threaded into it so as to project through a slot 29 in the plate 4. This carrier plate supports three short shafts or spindles 30, 31, and 32, of which the first supports a pinion 33 permanently in mesh with the pinion 14. The two spindles 31 and 32 have mounted on them a pair of coacting pinions 34 and 35 and the arrangement is such that when the carrier plate 27 is swung on the hollow shaft 13 in one direction, the gear 33 will mesh with the gear 20, while when it is swung in the opposite direction, the gear 35 meshes with said gear 20.

Under conditions of operation the boring bar 1 is rotated from a suitable source of power and all of the various parts mounted in or supported by the plates 4 and 6, bodily turn with it. If, however, the hand wheel 9 is held from turning, the hollow shaft 8 is likewise held, so that there is relative movement between it and the plates 6 and 4 and the boring bar 1.

While all of the gears 10, 11 and 12, are likewise held from moving, the gears 15, 16 and 17 rotate, and since in the case illustrated, the key 19 connects the gear 15 to the hollow shaft 13, this latter with the gear 14 is also turned. If it be assumed that the plate 27 has been clamped in a position such that the gear 33 meshes with the gear 20, power is transmitted from said gear 14, through the gears 33 and 20 to the feed screw 2, which is thus turned relatively to the boring bar 1 and causes a movement of the tool longitudinally of the latter.

If, after a certain length of cut has been made by the tool, it is desired to quickly return it to its original position or to rapidly move it to any other position, the carrier 27 is thrown to a neutral position, the socket 25 is applied to the end of the shaft 23 and after a suitable wrench has been placed on the squared end 26 of said socket, the shaft 23 may be turned by hand to rotate the feed screw 2 through the intermeshing gears 22 and 21; it being obvious that the speed at which said screw may thus be moved is considerably in excess of that at which it is turned under conditions of use. When the feed screw with the tool has been moved to the desired position, the machine may again be put in operation to actuate the tool by holding the hand wheel 9 or otherwise causing relative movement between it and the boring bar.

In that form of the invention shown in Fig. 4, there is illustrated an arrangement of parts whereby the shaft 23 may be turned by power to move the tool at a speed greater than that at which it is permissible to operate it when it is cutting. For this purpose I provide a suitable dog 36 clamped or otherwise fixed to the projecting end of the shaft 23 and having its laterally extended arm engaged by one of the spokes of the hand wheel 9 so that it is held from movement relatively to the rotating boring bar when said hand wheel is held;—the plate 27 being first moved to and clamped in a position in which its gears are disengaged from the gears with which they customarily coact.

In another form of the invention the gears 21 and 22, together with the shaft 23, may be omitted and the feed screw be directly turned at will independently of the gearing employed when the tool is cutting. For this purpose the end of said screw on which the gear 20 is mounted, is formed with a central hollow or recess of a section other than circular and a spindle 37 having a head 38 of the same cross sectional form as said recess, is provided to enter the latter. A passage 39 is also formed through the plate 6 in line with the feed screw 2 and any suitable means such as a crank or other handle is provided whereby the spindle 37 may be turned.

With this arrangement of parts, when it is desired to turn the feed screw at an increased speed, the spindle 37 is passed between the spokes of the hand wheel through the opening 39 in the plate 6, and its head 38 is entered in the recess in the end of the feed screw 2, whereupon the latter may be rotated by hand at any desired speed for the purpose of making a quick adjustment of the tool. From the above description it will be noted that I provide means whereby the feed screw may be turned to adjust the position of the tool on the boring bar independently of and at a speed higher than that ordinarily actuated.

In the case of that form of the invention shown in Fig. 3, the carrier plate 27 is adjusted to a position in which its gears are clear of the gear 20, so that when the latter is turned with the feed screw 2 by turning the spindle 37, the hand wheel 9 shall not be turned and thereby cause possible interference between its spokes and said spindle.

I claim:—

1. The combination of a boring bar; a tool-feeding screw journaled therein; two gears on said feed screw; a train of gearing carried by the boring bar and operative on one of said gears for turning the feed screw at a relatively low speed and including a hollow shaft; a second shaft mounted within said hollow shaft; a gear on said inner shaft meshing with the second gear on the feed screw; and means for turning the inner shaft at will.

2. The combination of a boring bar; a tool-feeding screw journaled in said bar; a plate mounted on the boring bar; a train of gearing mounted on the plate and operative on the feed screw; means including a hand wheel concentric with the boring bar for causing operation of the train of gearing to turn the feed screw relatively to said boring bar; and means operative on the feed screw for turning it independently of the gearing and of the hand wheel.

3. The combination of a boring bar; a tool-feeding screw journaled in said bar; a plate mounted on the boring bar; a train of gearing mounted on the plate and operative on the feed screw; means for causing operation of the train of gearing to turn the feed screw relatively to the boring bar; and means operative on the feed screw for turning it independently of the gearing, the same consisting of a shaft coaxial with the boring bar and means independent of the gearing for operatively connecting said shaft with the feed screw.

4. The combination of a boring bar; a tool-feeding screw journaled in said bar; a plate mounted on the boring bar; a train of gearing mounted on the plate and operative on the feed screw; means for causing operation of the train of gearing to turn the feed screw relatively to the boring bar; and means operative on the feed screw for turning it independently of the gearing consisting of a shaft coaxial with the boring bar; and two intermeshing gears in addition to the gearing train respectively fixed to the shaft and to the feed screw.

5. The combination of a boring bar; a tool feeding screw journaled in said bar; a plate mounted on the boring bar; a train of gearing mounted on the plate and operative on the feed screw; means for causing operation of the train of gearing to turn the feed screw relatively to the boring bar; and means operative on the feed screw for turning it independently of the gearing, the same consisting of a shaft coaxial with the boring bar, and means independent of the gearing for operatively connecting said shaft with the feed screw; with a device for causing said shaft to be driven from a portion of said gearing.

6. The combination of a boring bar; a tool-feeding screw journaled therein; a train of gearing including a hand wheel carried by the boring bar for causing the feed screw to be rotated at a relatively low speed; and means operative on said feed screw for turning it at a higher speed than that due to the operation of said gearing, the same consisting of a shaft concentric with said hand wheel, and means for operatively connecting said shaft to the feed screw.

In witness whereof I affix my signature.

HOWARD A. PEDRICK.

Copies of this patent may be obtained for five cents each, by addressing the "Commissioner of Patents, Washington, D. C."